(12) United States Patent
Caprera

(10) Patent No.: US 8,585,011 B2
(45) Date of Patent: Nov. 19, 2013

(54) CONTROL VALVE TRIM

(75) Inventor: Brian J. Caprera, Warwick, RI (US)

(73) Assignee: Cameron International Corporation, Houston, TX (US)

( * ) Notice: Subject to any disclaimer, the term of this patent is extended or adjusted under 35 U.S.C. 154(b) by 330 days.

(21) Appl. No.: 12/743,562

(22) PCT Filed: Nov. 21, 2008

(86) PCT No.: PCT/US2008/084428
§ 371 (c)(1),
(2), (4) Date: May 18, 2010

(87) PCT Pub. No.: WO2009/070512
PCT Pub. Date: Jun. 4, 2009

(65) Prior Publication Data
US 2010/0252768 A1  Oct. 7, 2010

Related U.S. Application Data

(60) Provisional application No. 60/990,233, filed on Nov. 26, 2007.

(51) Int. Cl.
*F16K 47/00* (2006.01)
*F16K 47/08* (2006.01)
*F16L 55/02* (2006.01)

(52) U.S. Cl.
USPC .................. 251/122; 137/625.3; 251/127

(58) Field of Classification Search
USPC ........ 137/625.3; 251/118, 122, 127, 281, 282
See application file for complete search history.

(56) References Cited

U.S. PATENT DOCUMENTS

| 1,645,601 | A | * | 10/1927 | Lee | 251/122 |
| 3,485,474 | A | * | 12/1969 | Baumann | 251/121 |
| 4,044,991 | A | * | 8/1977 | Waller | 251/122 |
| 5,113,908 | A | * | 5/1992 | Steinke | 137/625.3 |
| 5,803,119 | A | * | 9/1998 | Steinke | 137/625.37 |
| 7,055,548 | B2 | * | 6/2006 | Hamblin et al. | 137/625.37 |

FOREIGN PATENT DOCUMENTS

FR    2582072 A1 * 11/1986

OTHER PUBLICATIONS

PCT International Search Report and Written Opinion for PCTUS2008/084428, dated Mar. 26, 2009.

* cited by examiner

*Primary Examiner* — John K Fristoe, Jr.
*Assistant Examiner* — Frederick D Soski
(74) *Attorney, Agent, or Firm* — Fletcher Yoder, P.C.

(57) ABSTRACT

Provided is a control valve trim, including a plug having a plurality of sections arranged in series along a longitudinal axis, wherein each of the plurality of sections has a diameter that is greater than the diameter of the preceding section, and a plurality of slots in the surface of each of the plurality of sections, and a liner, wherein the plug is disposed internal to the liner.

16 Claims, 16 Drawing Sheets

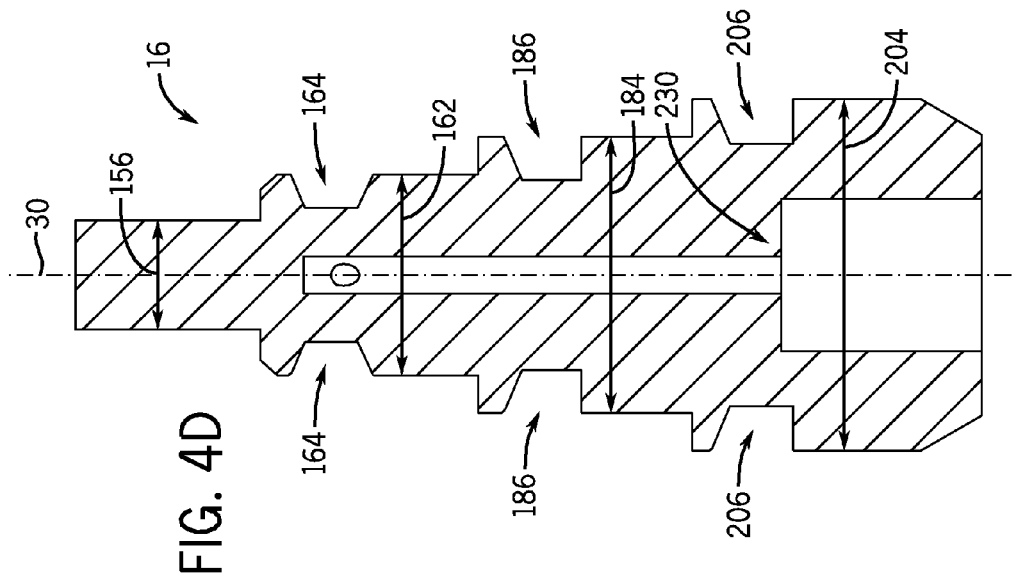
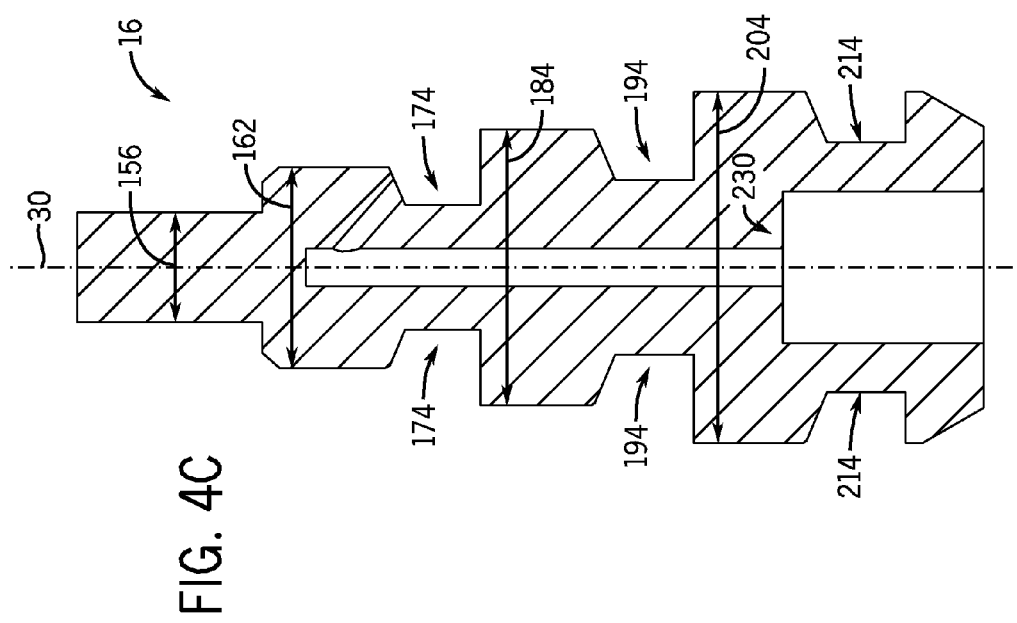

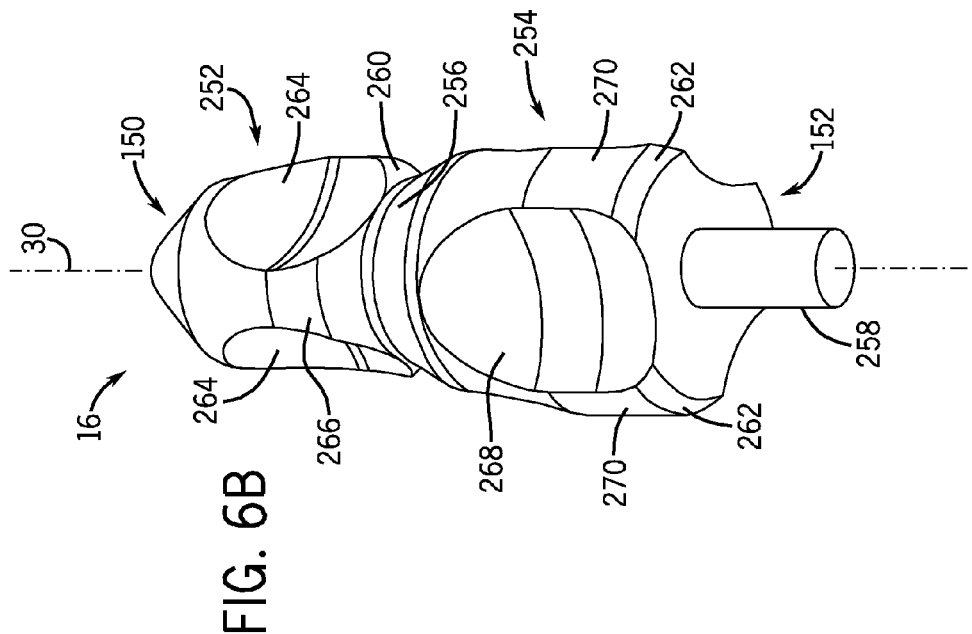
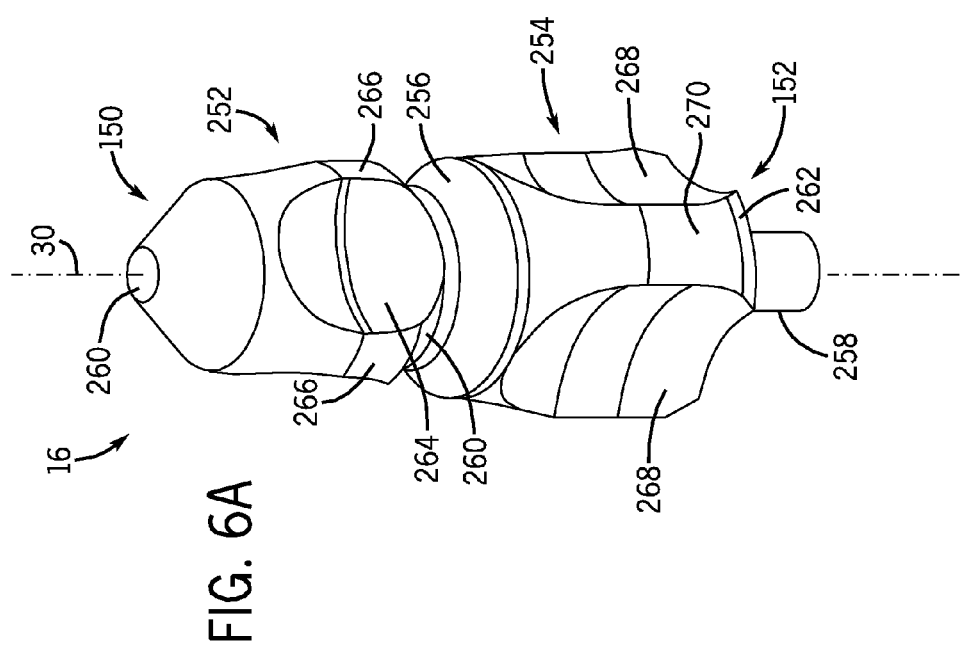

CONTROL VALVE TRIM

CROSS-REFERENCE TO RELATED APPLICATIONS

This application claims priority to and benefit of PCT Patent Application No. PCT/US2008/084428, entitled "Control Valve Trim", filed Nov. 21, 2008, which is herein incorporated by reference in its entirety, and which claims priority to and benefit of U.S. Provisional Patent Application No. 60/990,233, entitled "Control Valve Trim", filed on Nov. 26, 2007, which is herein incorporated by reference in its entirety.

FIELD OF THE INVENTION

This invention relates to fluid systems. More particularly, the present invention relates to a valve for use with various flow control systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a variety of fluid (e.g., including gas) handing systems, the flow of a fluid is controlled by a valve. In the production of oil and natural gas, valves are employed to direct and regulate the flow of fluids (e.g., gas, water, and oil) in pipes, wells, pumps, vessels, and refineries. Valves generally include an open position that enables fluid flow and a closed position that reduces or completely shuts-off the fluid flow. Valves are also employed to regulate (e.g., throttle) the pressure and flow rate of the fluid flowing through the valve. For example, the valve may be partially closed, or may include an occlusion that obstructs the fluid flow. An obstruction may include a control valve trim that throttles the fluid flow. Throttling is particularly useful where fluid flow occurs at a high rate and/or pressure and it is desirable to reduce the flow rate and/or pressure. Accordingly, valves employing throttling may be particularly well suited to direct fluid flow from oil and gas wells where the pressure of the fluids being expelled from the mineral reservoir may exceed 3,000 pounds per square inch (psi), for instance.

Due to the high flow rates and high pressures, fluids passing through a valve or the control valve trim may experience cavitation, flashing, and may generate an excessive amount of noise. Further, the abrasive nature of fluids may cause erosion and extensive wear on components, such as the control valve trim. Cavitation, flashing, vibrations due to noise, and erosion can individually, or in combination, reduce the performance of the valve and may even lead to failure of the valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 4C is a cross-sectioned view of the plug of FIG. 4A taken across line 4C-4C of FIG. 4A;

FIG. 4D is a cross-sectioned view of the plug of FIG. 4A taken across line 4D-4D of FIG. 4A;

FIGS. 6A and 6B are perspective views of another exemplary embodiment of a plug of the control valve trim;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
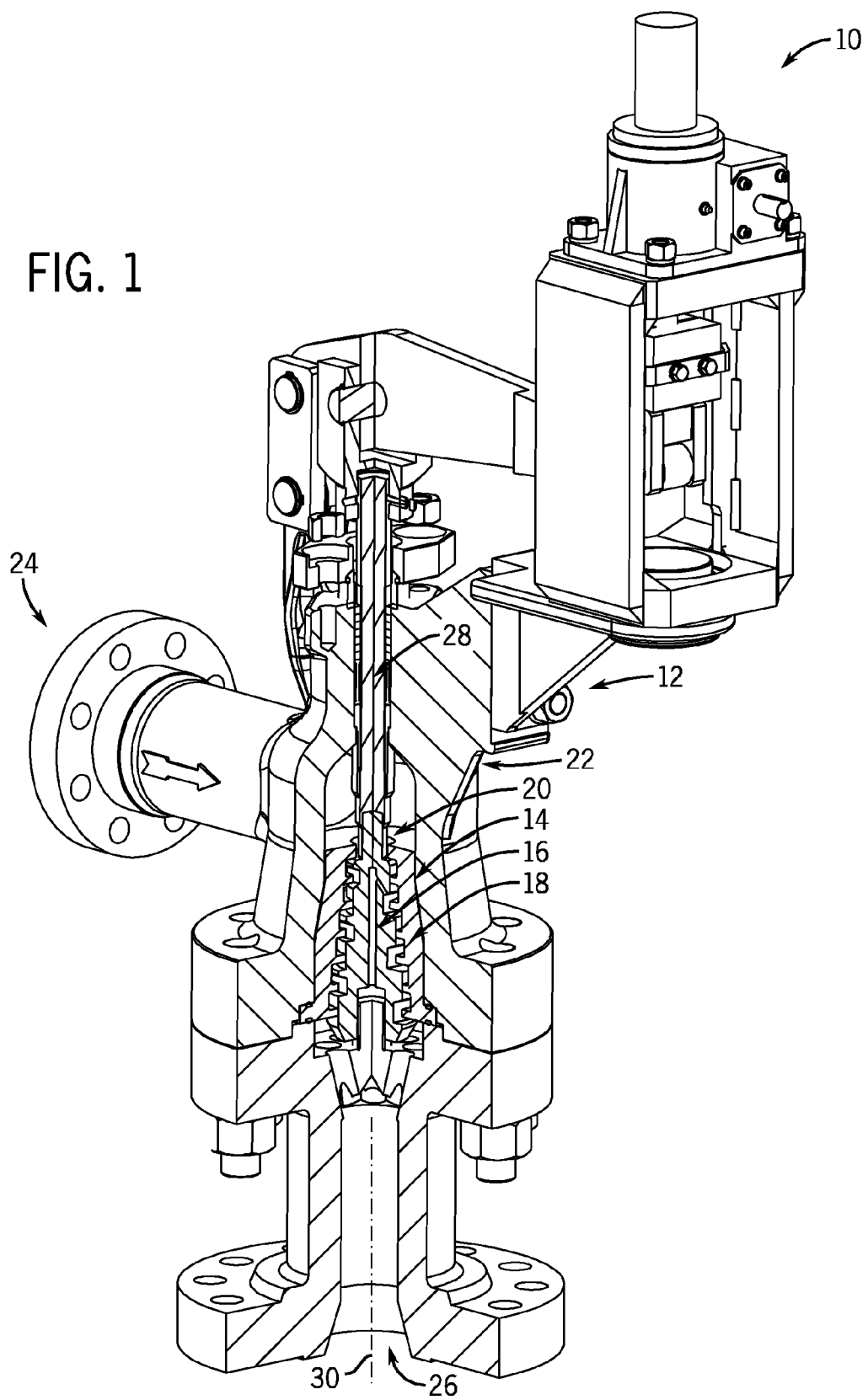
FIG. 1 is a perspective cross-sectioned view of a valve having a control valve trim in accordance with embodiments of the present technique.

Referring now to FIG. 1, the illustrated valve system 10 includes a valve 12 having a control valve trim 14 in accordance with embodiments of the present technique. Specifically, the control valve trim 14 includes a multistage, rising stem and expanding area control valve trim configured for use in severe (e.g., high pressure and flow rate) service. In the illustrated embodiment, the control valve trim 14 includes a plug 16 disposed in a liner 18. The control valve trim 14 is disposed inside of a flow bore 20 of a valve body 22.

In operation, fluid flows into the flow bore 20 of the valve body 22 via an inlet 24, through the control valve trim 14 and exits the valve 12 via an outlet 26. (It will be appreciated that the term fluid encompasses fluid media including a liquid and/or gaseous state, such as water and steam, and further encompasses mixed-phase media, such as media having suspended solids, for example.) As the fluid passes through the control valve trim 14, the fluid is directed through a variety of throttling (e.g., pressure and/or velocity reducing) points that absorb energy from the fluid, thereby reducing the pressure and the velocity of the fluid as it travels through the control valve trim 14.

Flow characteristics of the passing fluid can be regulated or altered by manipulating the position of the plug 16. The position of the plug 16 relative to the liner 18 may be controlled via an actuator mechanism 28. The actuator mechanism 28 may be employed to slide the plug 16 along a longitudinal axis 30 of the bore 20 and the control valve trim 14. For example, in the illustrated embodiment, the actuator mechanism 28 includes a stem disposed parallel to the longitudinal axis 30 and coupled to the plug 16.

Turning the fluid from one direction to another may provide an effective reduction of fluid velocity. However, the fluid acting on a surface, such as the plug 16 or liner 18, may cause a high rate of localized erosion. Increasing the bend radius may distribute the energy across a larger area, thereby reducing the likelihood of erosion. However, reducing the turn angle may include throttling over a large distance (e.g., sweep) making it impractical in the physical space limitations of the valve system 10.

A change in area along the fluid path may produce less trim surface erosion (e.g., wear), as suggested above, and may be capable of absorbing the same amount of energy due to the velocity and turbulence of the fluid flow that is occurring a distance away from the surface. However, an expanding area may employ an increasing amount of space to absorb a given amount of energy. Further, the pressure drop along the flow path may cause some fluids to expand, and can result in the process stream choking (e.g. being restricted) on subsequent stages. In other words, the fluid path may be inhibited by the low-pressure high-volume fluid down stream, resulting in a reduced throughput of the valve 12.

The embodiments discussed in further detail below include a system and method of throttling the fluid through the control valve trim 14 that employs horizontal and vertical fluid turns with increasing flow area. The control valve trim 14 includes multiple stages having an expanding area between stages, in certain embodiments. For instance, the plug 16 and liner 18 may each include expanding diameters between each of the stages. In certain embodiments, the control valve trim 14 may inhibit flashing (e.g., the pressure dropping to a level causing the fluid to bubble) of expanding fluids. Further, in certain embodiments, a diameter of a last stage may be larger than the diameter of the first stage. The flow path through the control valve trim 14 may include axial, normal, and circumferential fluid flow. In other words, the control valve trim 14 provides a three-dimensional (3D) tortuous fluid path of interconnected stages (e.g., chambers). Each flow turn of the fluid path includes an area increase to reduce the fluid velocity at the trim surface, thereby helping to reduce the erosion at the trim surface.

The increase in flow area can also result in the valve 12 and the control valve trim 14 being trash-tolerant. In other words, the sequential increase in size may help to reduce the likelihood of debris forming a clog between the plug 16 and the liner 18.

Further, the larger diameter of the last stage of the control valve trim 14 also facilitates the inclusion of a guide bushing with an integral balance chamber, in certain embodiments. The chamber can be energized via a pressure tap to an upstream stage, and the amount of force can be tailored to the application by changing the position of the pressure tap. In operation, as the fluid media pressure acts on the plug 16 from the upstream direction, the balance chamber can exert a force in the opposite direction to balance the force acting on the plug 16. In certain embodiments, the balance chamber may be employed to provide a balancing force across the plug that facilitates reducing the size of the actuator mechanism 28. It is further noted that no direct contact seals may be employed in the balancing valve trim. Thus, the valve pressure, temperature, and/or chemistry may not be limited to common seal materials.

Figure 2A:
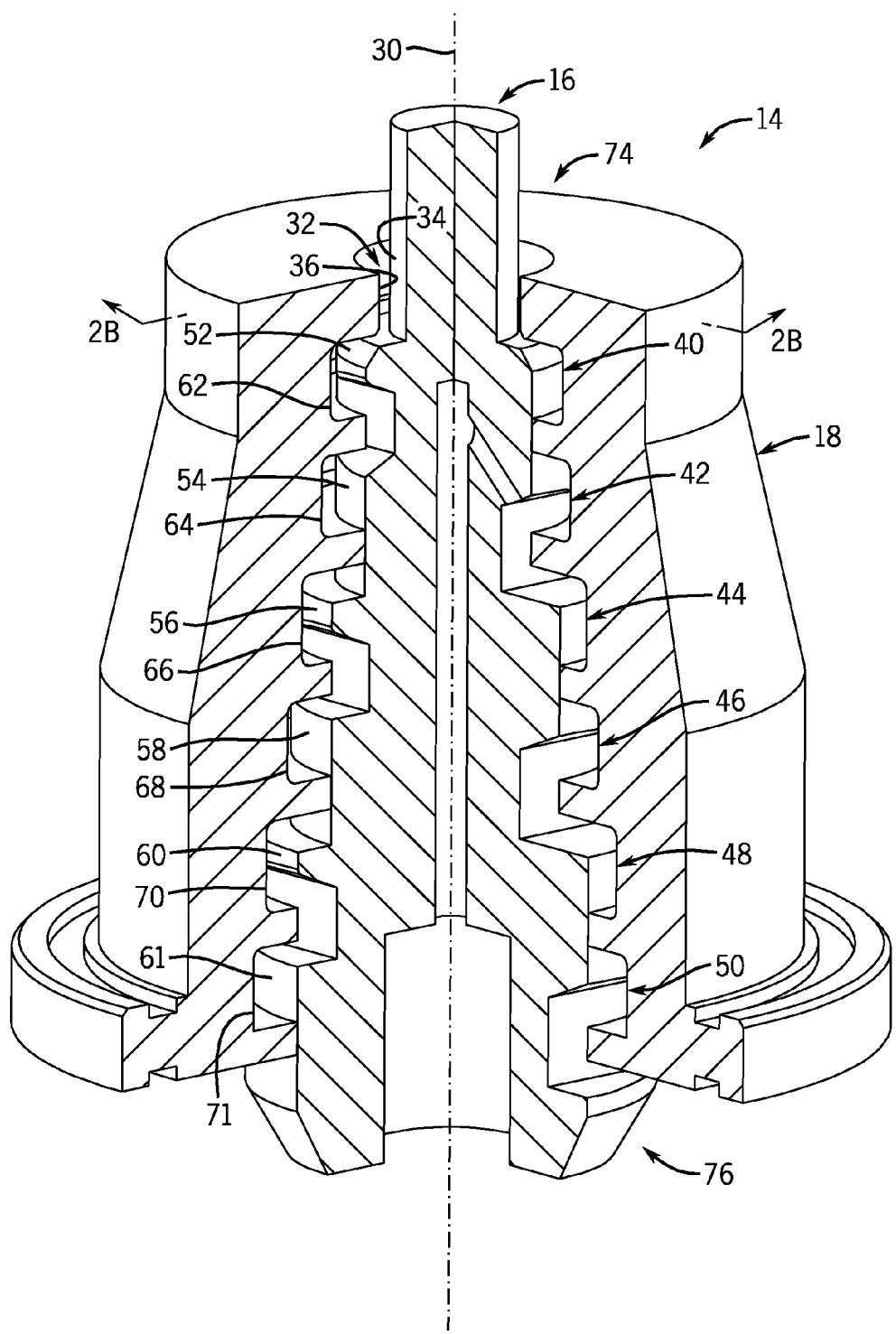
FIG. 2A is a perspective cross-sectioned view of an embodiment of the control valve trim of FIG. 1.
Figure 2B:
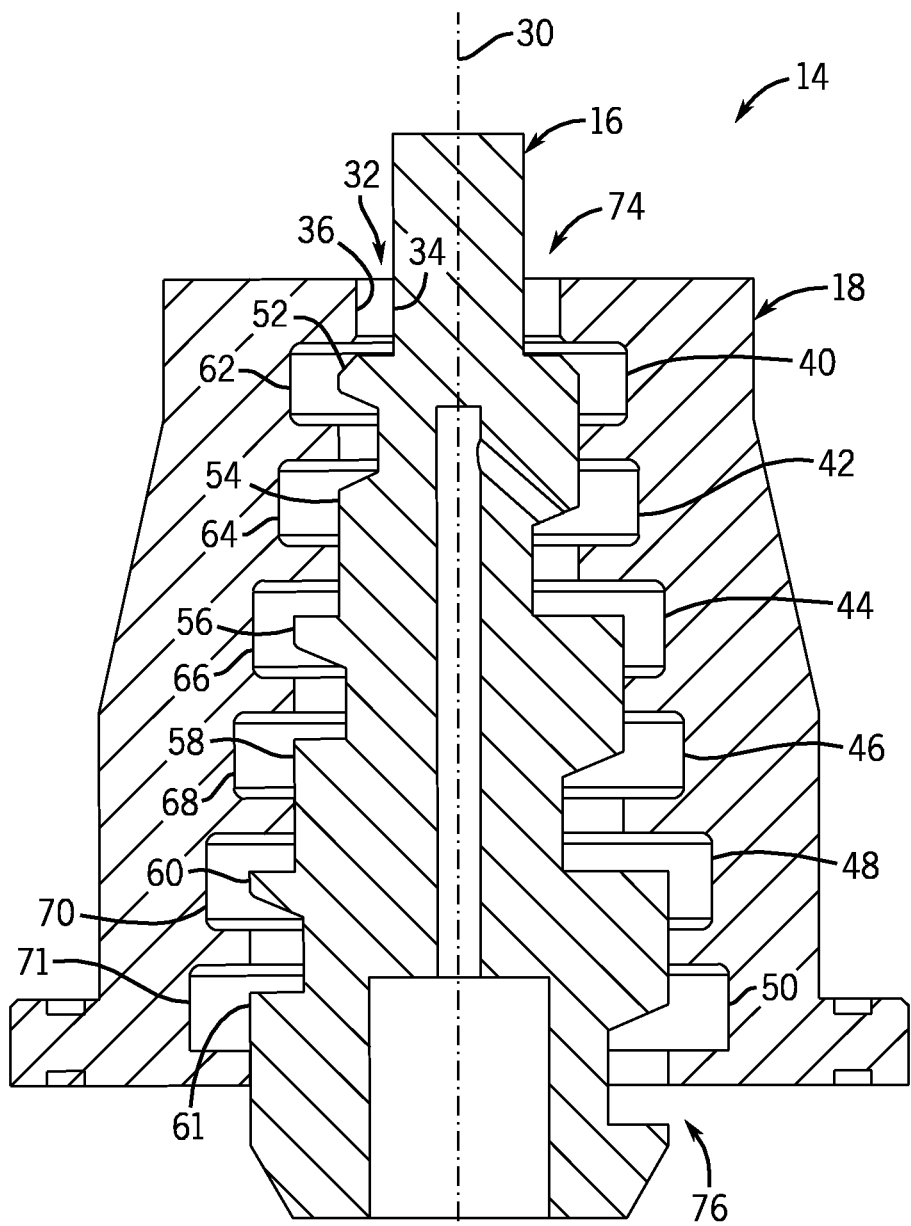
FIG. 2B is a cross-sectioned view of the control valve trim of FIG. 2A taken across line 2B-2B of FIG. 2A.

Turning now to FIGS. 2A-2B, an embodiment of the control valve trim 14 is depicted. As discussed previously, the control valve trim 14 includes the plug 16 and the liner 18. The plug 16 and the liner 18 are disposed coaxially along the longitudinal axis 30. In the illustrated embodiment, the control valve trim 14 includes a throttling channel 32. The channel 32 includes a region between an exterior surface 34 of the plug 16 and an interior surface 36 of the liner 18. The channel 32 includes six stages 40, 42, 44, 46, 48, and 50 that are defined by protrusions 52, 54, 56, 58, 60, and 61 of the plug 16, and annular recesses 62, 64, 66, 68, 70, and 71 of the liner 18, respectively. The stages 40, 42, 44, 46, 48, and 50 are arranged in series, such that fluid may flow in from a first end 74 of the channel 32, pass through each of the six stages 40, 42, 44, 46, 48, and 50, and exit via a second end 76 of the channel 32.

Figure 3A:
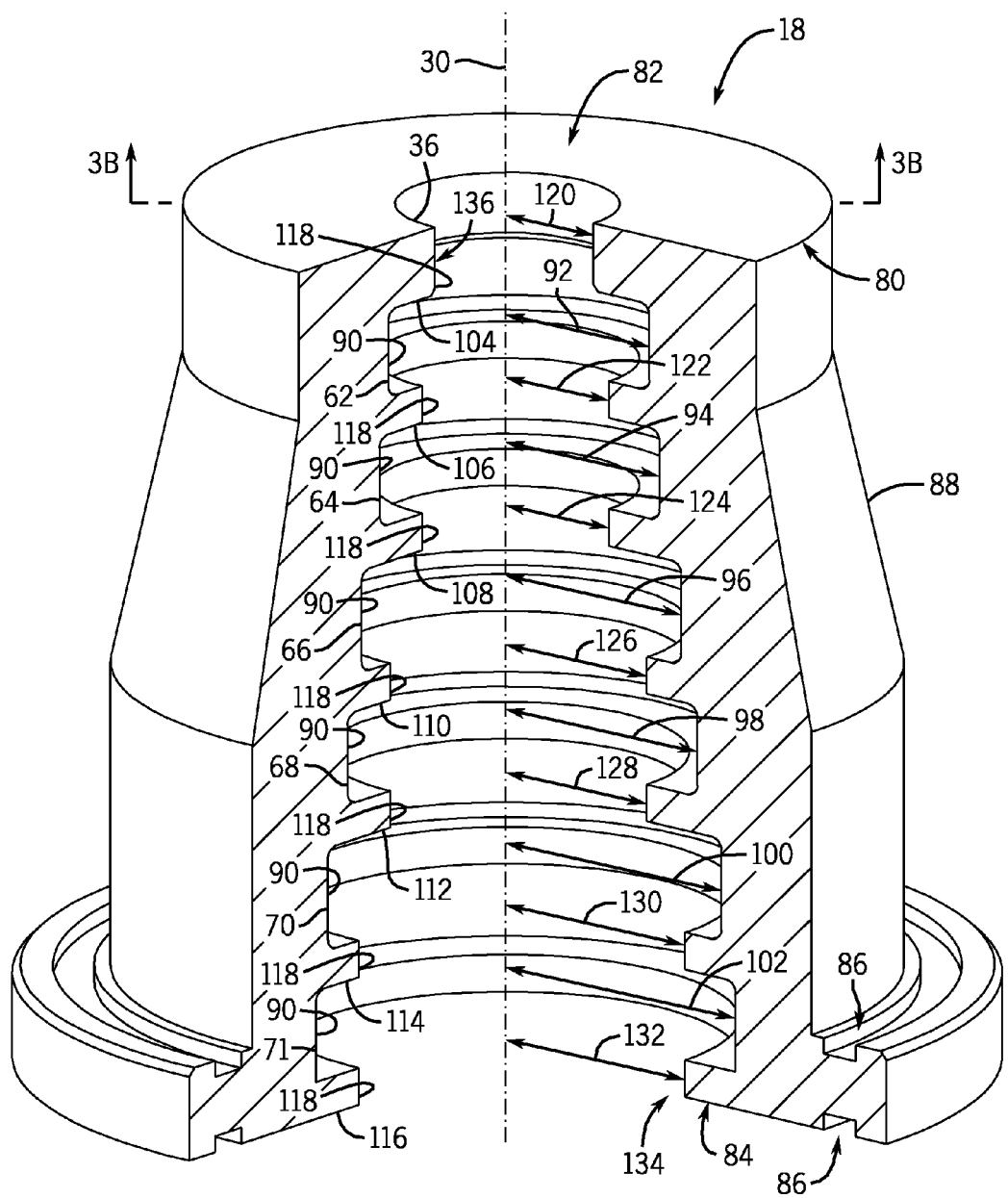
FIG. 3A is a perspective cross-sectioned view of an embodiment of a liner of the control valve trim of FIGS. 2A-2B.
Figure 3C:
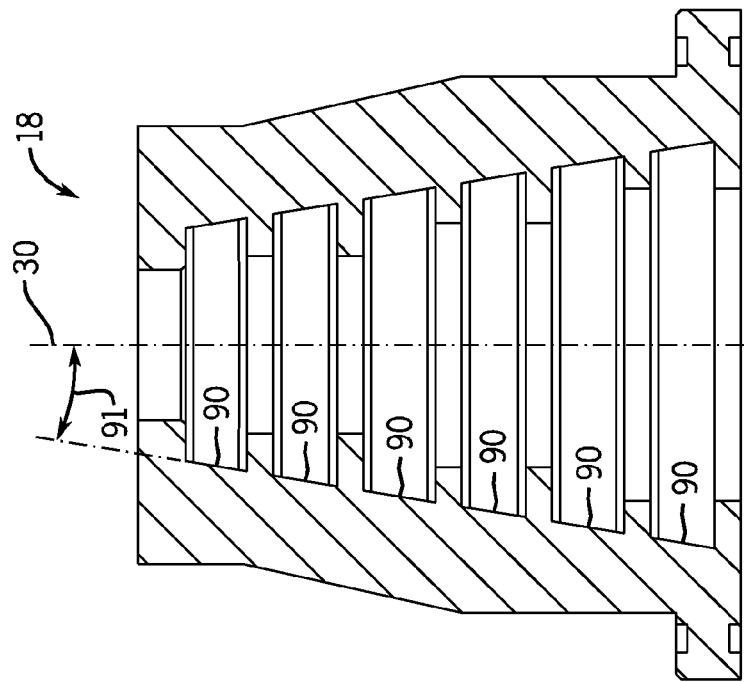
FIG. 3C is a cross-sectioned view of an alternate embodiment of the liner of FIG. 3A in accordance with embodiments of the present technique.
Figure 3B:
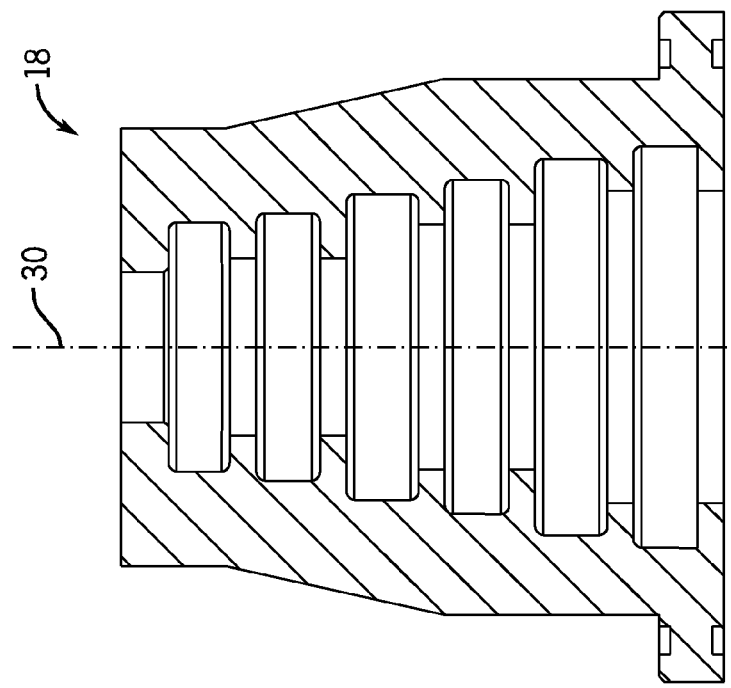
FIG. 3B is a cross-sectioned view of the liner of FIG. 3A taken across line 3B-3B of FIG. 3A.

FIGS. 3A-3B illustrate a perspective-sectioned view and a sectioned view of the liner 18 in accordance with aspects of the present technique. The liner 18 includes a liner body 80 having a first (upstream) end 82 and a second (downstream) end 84. The first end 82 is configured to be disposed in the flow bore 20 of the valve 12 and to direct fluid flow into the channel 32 that is defined by the internal surface 36 of the liner 18. The second end 84 is configured to be disposed proximate the outlet 26 of the valve 12. In the illustrated embodiment, the second end 84 of the liner 18 includes recesses 86 (e.g., annular recesses) that may accept a sealing member (e.g., a metallic or elastomeric sealing ring) disposed between the liner 18 and the valve 12, or between the liner 18 and another component, such as a pipe or flange, coupled to the outlet 26 of the valve 12.

The liner 18 includes an external surface 88 that facilitates disposing the liner 18 into the fluid bore 20 of the valve 12. In other words, the profile of the external surface 88 is similar to and/or conforms to the profile of an internal surface of the fluid bore 20. When the liner 18 is disposed in the fluid bore 20, the interface between the liner 18 and the fluid bore 20 may effectively create a seal, thereby forcing fluid from the bore 20 into the channel 32 of the control valve trim 14.

The internal surface 36 of the liner 18 is defined by the series of annular recesses 62, 64, 66, 68, 70, and 71. In the illustrated embodiment, the liner 18 includes six of these annular recesses 62, 64, 66, 68, 70, and 71. Each of the recesses 62, 64, 66, 68, 70, and 71 includes a notch that sweeps about the interior 36 of the liner 18. In the illustrated embodiment, the annular recesses 62, 64, 66, 68, 70, and 71 each include an internal face 90 that is approximately parallel with the longitudinal axis 30. The faces 90 define internal radii 92, 94, 96, 98, 100, and 102 of the annular recesses 62, 64, 66, 68, 70, and 71, respectively. In one embodiment, all or some of the faces 90 may be oriented at an angle to promote certain fluid flow paths. For example, as depicted in FIG. 3C, each of the faces 90 are oriented at an angle 91 from the longitudinal axis 30.

Further, the annular recesses 62, 64, 66, 68, 70, and 71 may be described as defining seven annular protrusions 104, 106, 108, 110, 112, 114, and 116. The annular protrusions 104, 106, 108, 110, 112, 114, and 116 each include a ring-like or rib-like structure between the annular recesses 62, 64, 66, 68, 70, and 71 and between the first and second ends 82 and 84 of the liner 18. Each of the protrusions 104, 106, 108, 110, 112, 114, and 116 includes an internal face 118 that is approximately parallel with the longitudinal axis 30. Accordingly, the faces 118 may be parallel with the faces 90 of the annular recesses 62, 64, 66, 68, 70, and 71, discussed above. The faces 118 define internal radii 120, 122, 124, 126, 128, 130, and 132 of the protrusions 104, 106, 108, 110, 112, 114, and 116, respectively. In other embodiments, all or some of the faces 118 may be oriented at an angle to promote certain fluid flow paths.

As illustrated, the radius of each annular recess 62, 64, 66, 68, 70, and 71 may be equal to or greater than the radius of the preceding (e.g., upstream) annular recess. In one embodiment, the radius 102 of the last annular recess 71 is approximately twice (2X) the radius 92 of the first annular recess 62 of the liner 18. Similarly, each of the protrusions 104, 106, 108, 110, 112, 114, and 116 may be equal to or greater than the radius of the preceding (e.g., upstream) protrusion. In one embodiment, the radius 132 of the last protrusion 116 (e.g., an outlet 134 of the liner 18) is approximately twice (2X) the radius 120 of the first protrusion 104 (e.g., an inlet 136) of the liner 18.

For example, in the illustrated embodiment, the first radius 92 is approximately 1.4 inches, the second radius 94 is approximately 1.5 inches, the third radius 96 is approximately 1.72 inches, the fourth radius 98 is approximately 1.88 inches, the fifth radius 100 is approximately 2.11 inches, and the sixth radius 102 is approximately 2.25 inches. Further, with regard to the protrusions 104, 106, 108, 110, 112, 114, and 116, the first radius 120 is approximately 0.85 inches, the second radius 122 is approximately 1 inch, the third radius 124 is approximately 1 inch, the fourth radius 126 is approximately 1.38 inches, the fifth radius 128 is approximately 1.38, the sixth radius 130 is approximately 1.75, and the seventh radius 132 is approximately 1.75 inches.

FIGS. 4A-4D illustrate the plug 16 in accordance with embodiments of the present technique. As illustrated, the plug 16 includes a series of cylindrical sections increasing in diameter from a first (upstream) end 150 to a second (downstream) end 152 of the plug 16. In the illustrated embodiment, a first section (stem) 154 includes a cylindrical protrusion extending from the first end 150 of the plug 16. In certain embodiments, the stem 154 may be coupled to the actuator mechanism 28, as discussed above with regard to FIG. 1. In the illustrated embodiment, the stem 154 includes an outer diameter 156 that is equal to or less than the diameter of the inlet 136 of the liner 18. For example, in the illustrated embodiment, the diameter 156 of the stem 154 is approximately 1.09 inches. The plug 16 may be inserted through the outlet 134 of the liner 18 such that the stem 154 extends through the inlet 136.

A second section 160 of the plug 16 includes an outer diameter 162 that is greater than the diameter 156 of the stem 154. Further, the outer diameter 162 of the second section 160 is less than or equal to the inner diameter 122 of the second protrusion 106 and the inner diameter 124 of the third protrusion 108 of the liner 18. For example, in the illustrated embodiment, the diameter 162 of the second section 160 is approximately 2 inches.

Further, the second section 160 includes multiple slots that are configured to direct fluid flow around the plug 16. For example, a pair of first slots 164 is cut into the outer surface of the second section 160 proximate the stem 154 (upstream). The slots 164 are on opposite sides of the second section 160 from one another (e.g., offset on either side of the longitudinal axis 30), and are aligned with one another along a plane transverse to the longitudinal axis 30. In other words, the slots 164 are cut at approximately the same axial location along the length of the plug 16. The slots 164 have faces 166 that are parallel to one another and parallel to the longitudinal axis 30. A lower face 168 of each slot 164 is perpendicular to the face 166 and to the longitudinal axis 30. An upper face 170 of each slot 164 is angled relative to the face 166 and to the longitudinal axis 30. The angle between the upper face 170 and the face 166 is obtuse. In other words, the upper face 170 defines a chamfer that extends from the outer surface of the second section 160 to the face 166.

A pair of second slots 174 is cut into the outer surface of the second section 160 proximate a third section 176 (downstream). The slots 174 are on opposite sides of the second section 160 from one another (e.g., offset on either side of the longitudinal axis 30), and are aligned with one another along a plane transverse to the longitudinal axis 30. In other words, the slots 174 are cut at approximately the same axial location along the length of the plug 16. The slots 174 have faces 178 that are parallel to one another and parallel to the longitudinal axis 30. However, the slots 174 are not parallel to the first slots 164. The slots 174 are rotated 90 degrees about the longitudinal axis 30 such that the faces 178 of the slots 174 are oriented perpendicular to the faces 166 of the first slots 164 (e.g., planes passing through the first faces 166 and the second faces 178 are parallel to the longitudinal axis 30, and are perpendicular to one another). A lower face 180 of each slot 174 is defined by a top surface of the third section 176 that is perpendicular to the face 178 and to the longitudinal axis 30. An upper face 182 of each slot 174 is angled relative to the face 178 and to the longitudinal axis 30. The angle between the upper face 182 and the face 178 is obtuse. In other words, the upper face 182 defines a chamfer that extends from the outer surface of the second section 160 to the face 178.

The third section 176 of the plug 16 includes an outer diameter 184 that is greater than the outer diameter 162 of the second section 160. Further, the outer diameter 184 of the third section 176 is less than or equal to the inner diameter 126 of the fourth protrusion 110 and the inner diameter 128 of the fifth protrusion 112. For example, in the illustrated embodiment, the diameter 184 of the third section 176 is approximately 2.75 inches.

Similar to the second section 160, the third section 176 includes multiple slots that are configured to direct fluid flow around the plug 16. For example, a pair of first slots 186 is cut into the outer surface of the third section 176 proximate the second section 160 (upstream). The slots 186 are on opposite sides of the third section 176 from one another (e.g., offset on either side of the longitudinal axis 30), and are aligned with one another along a plane transverse to the longitudinal axis 30. In other words, the slots 186 are cut at approximately the same axial location along the length of the plug 16. The slots 186 have faces 188 that are parallel to one another and parallel to the longitudinal axis 30. The faces 188 are also parallel to the faces 166 of the first slots 164 in the first section 160. A lower face 190 of each slot 186 is perpendicular to the face 188 and to the longitudinal axis 30. An upper face 192 of each slot 186 is angled relative to the face 188 and to the longitudinal axis 30. The angle between the upper face 192 and the face 188 is obtuse. In other words, the upper face 192 defines a chamfer that extends from the outer surface of the third section 176 to the face 188.

A pair of second slots 194 is cut into the outer surface of the third section 176 proximate a fourth section 196 (downstream). The slots 194 are on opposite sides of the third section 176 from one another (e.g., offset on either side of the longitudinal axis 30), and are aligned with one another along a plane transverse to the longitudinal axis 30. In other words, the slots 194 are cut at approximately the same axial location along the length of the plug 16. The slots 194 have faces 198 that are parallel to one another and parallel to the longitudinal axis 30. However, the slots 194 are not parallel to the first slots 186. The slots 194 are rotated 90 degrees about the longitudinal axis 30 such that the faces 198 of the second slots 194 are oriented perpendicular to the faces 188 of the first slots 186 (e.g., planes passing through the first faces 188 and the second faces 198 are parallel to the longitudinal axis 30, and are perpendicular to one another). The faces 198 are also parallel to the faces 178 of the second slots 174 in the first section 160. A lower face 200 of each slot 194 is defined by a top surface of the fourth section 196 that is perpendicular to the face 198 and to the longitudinal axis 30. An upper face 202 of each slot 194 is angled relative to the face 198 and to the longitudinal axis 30. The angle between the upper face 202 and the face 198 is obtuse. In other words, the upper face 202 defines a chamfer that extends from the outer surface of the third section 176 to the face 198.

The fourth section 196 of the plug 16 includes an outer diameter 204 that is greater than the outer diameter 184 of the third section 176. Further, the outer diameter 204 of the fourth section 196 is less than or equal to the inner diameter 130 of the sixth protrusion 114 and the inner diameter 132 of the seventh protrusion 116. For example, in the illustrated embodiment, the diameter 204 of the fourth section 196 is approximately 3.5 inches.

Similar to the second and third sections 160 and 176, the fourth section 196 includes multiple slots that are configured to direct fluid flow around the plug 16. For example, a pair of first slots 206 is cut into the outer surface of the fourth section 196 proximate the third section 176 (upstream). The slots 206 are on opposite sides of the fourth section 196 from one another (e.g., offset on either side of the longitudinal axis 30), and are aligned with one another along a plane transverse to the longitudinal axis 30. In other words, the slots 206 are cut at approximately the same axial location along the length of the plug 16. The slots 206 have faces 208 that are parallel to one another and parallel to the longitudinal axis 30. The faces 208 are also parallel to the faces 188 and 166 of the first slots 164 and 186 in the first and second sections 160 and 176, respectively. A lower face 210 of each slot 206 is perpendicular to the face 208 and to the longitudinal axis 30. An upper face 212 of each slot 206 is angled relative to the face 208 and to the longitudinal axis 30. The angle between the upper face 212 and the face 208 is obtuse. In other words, the upper face 212 defines a chamfer that extends from the outer surface of the fourth section 196 to the face 208.

A pair of second slots 214 is cut into the outer surface of the fourth section 196 proximate a second (downstream) end 152 of the plug 16. The slots 214 are on opposite sides of the fourth section 196 from one another (e.g., offset on either side of the longitudinal axis 30), and are aligned with one another along a plane transverse to the longitudinal axis 30. In other words, the slots 214 are cut at approximately the same axial location along the length of the plug 16. The slots 214 have faces 216 that are parallel to one another and parallel to the longitudinal axis 30. However, the slots 214 are not parallel to the first slots 206. The slots 214 are rotated 90 degrees about the longitudinal axis 30 such that the faces 216 of the second slots 214 are oriented perpendicular to the faces 208 of the first slots 206 (e.g., planes passing through the first faces 208 and the second faces 216 are parallel to the longitudinal axis 30, and are perpendicular to one another). The faces 216 are also parallel to the faces 178 and 198 of the first and second slots 174 and 194 in the first and second sections 160 and 176, respectively. A lower face 218 of each slot 214 is perpendicular to the face 216 and to the longitudinal axis 30. An upper face 220 of each slot 214 is angled relative to the face 216 and to the longitudinal axis 30. The angle between the upper face 220 and the face 216 is obtuse. In other words, the upper face 220 defines a chamfer that extends from the outer surface of the fourth section 196 to the face 216.

Figure 4A:
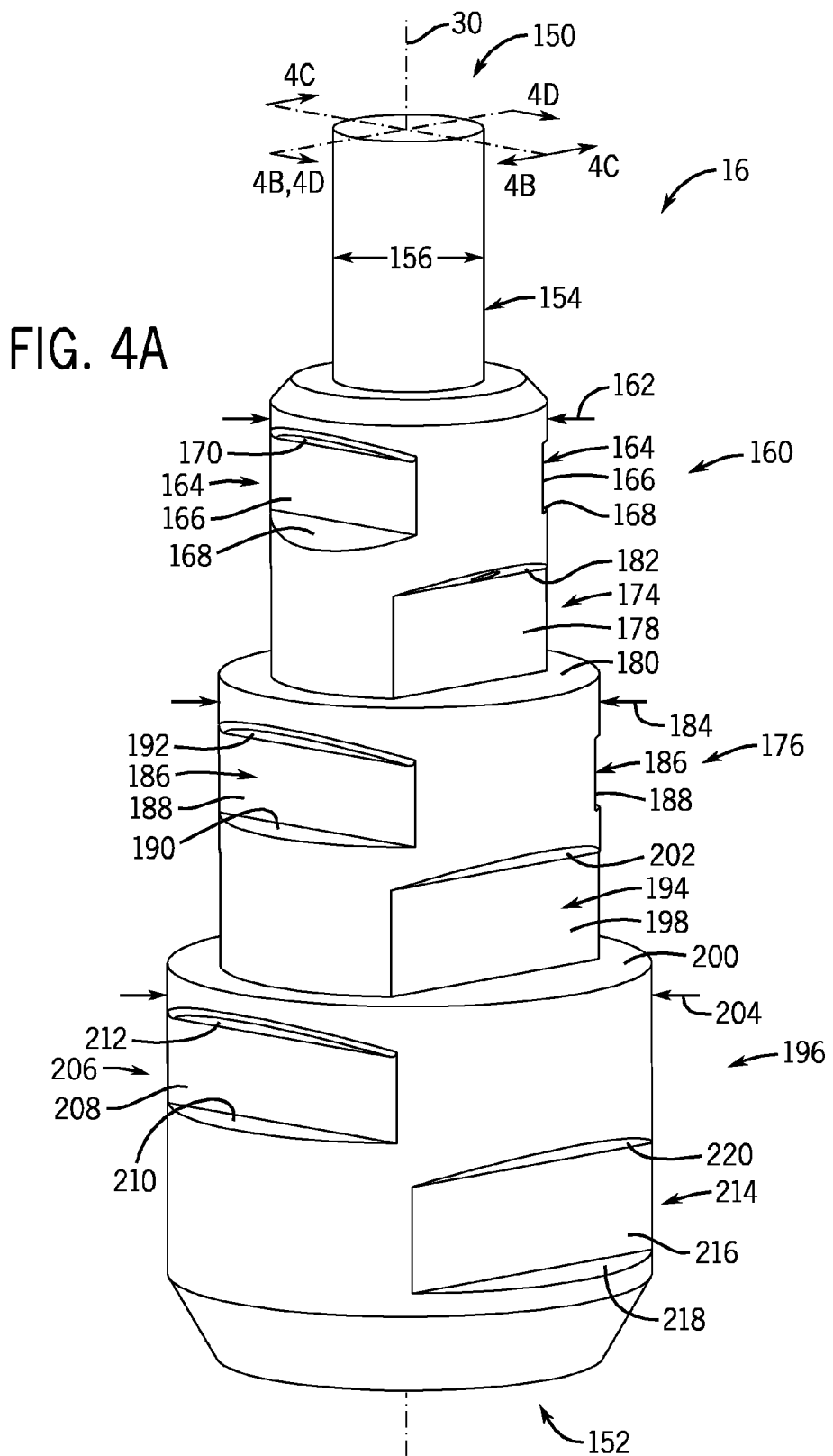
FIG. 4A is a perspective view of an embodiment of a plug of the control valve trim of FIGS. 2A-2B.
Figure 4B:
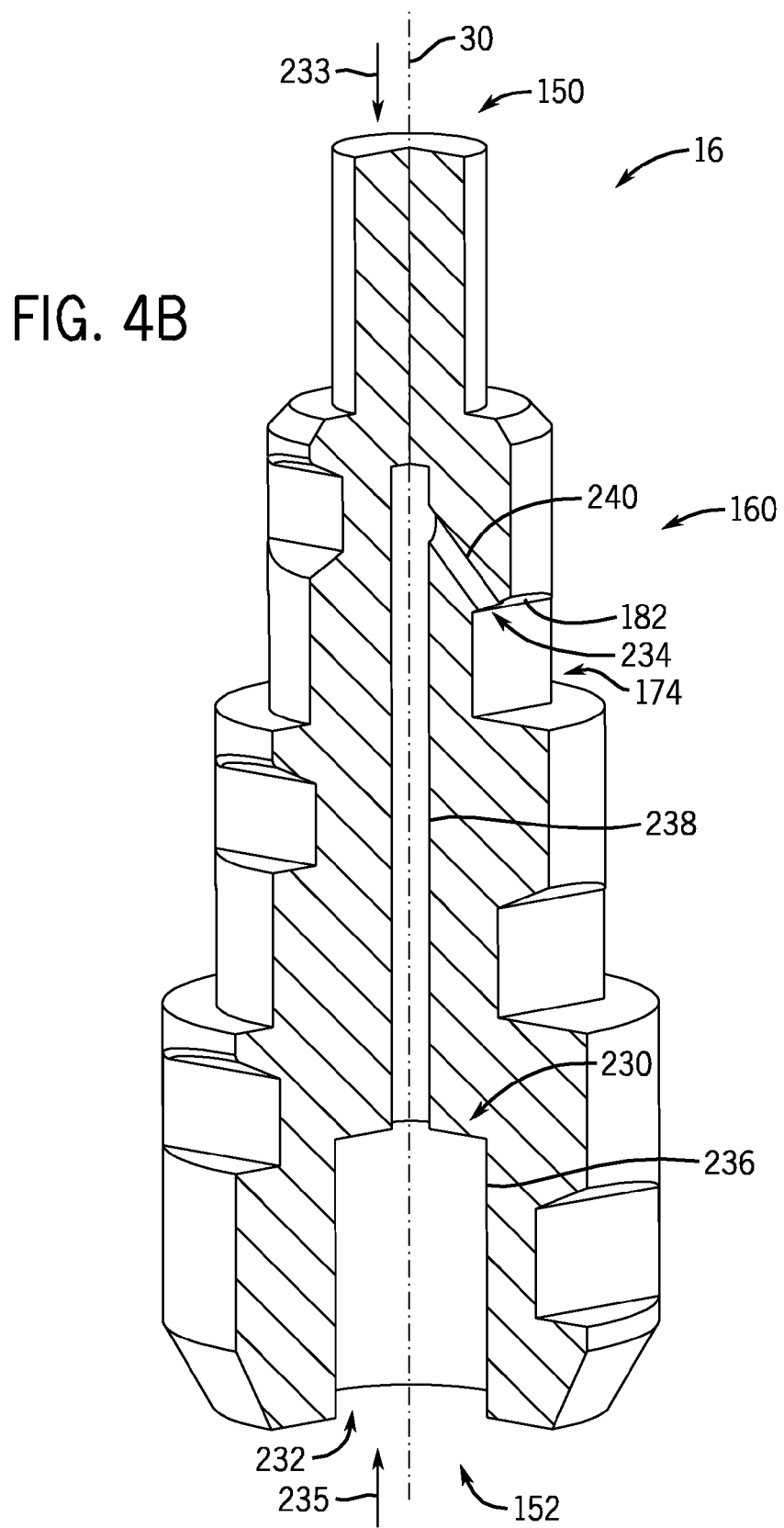
FIG. 4B is perspective sectioned view of the plug of FIG. 4A without the section indicated by lines 4B-4B in accordance with embodiments of the present technique.

FIG. 4B illustrates a view of a balancing chamber 230 that is internal to the plug 16. The balancing chamber 230 includes a fluid path that extends from a first tap 232 in the second (downstream) end 152 of the plug 16 to a second tap 234 that is proximate the first (upstream) end 150 of the plug 16. The balancing chamber 230 is energized via pressure that enters at the first tap 234. In operation, as the fluid pressure exerts a force that acts on the plug 16 in the downstream direction (as indicated by arrow 233), the pressure at the first tap 232 exerts a balancing force that acts in the opposite direction (e.g., acting on the plug 16 in an upstream direction as indicated by arrow 235).

In the illustrated embodiment, the balancing chamber 230 includes a first bore 236, a second bore 238, and a third bore 240. The first bore 236 includes a cylindrical chamber that is coaxial with the longitudinal axis 30 of the plug 16. The first bore 236 terminates at the first tap 232 at one end, and into the second bore 238 at the other end. In certain embodiments, the second bore 238 includes a cylindrical bore extending along the length of the plug 16, coaxial with the longitudinal axis 30 and the first bore 236. However, the second bore 238 does not extend through the first (upstream) end 150 of the plug 16, but terminates internal to the plug 16. The second bore 238 has a diameter (e.g., 0.37 inches) that is less than the diameter of the first bore 236 (e.g., 1.51 inches). The third bore 240 includes a cylindrical bore that extends from the second bore 238 to the second tap 234 located on an external surface of the plug 16. In the illustrated embodiment, the second tap 234 is located on the top face 182 of the second set of slots 174 in the second section 160 of the plug 16. The location of the second tap 234 can be modified to provide a varying amount of balancing force. For example, the second tap 234 may be located further upstream or downstream on the plug 16. The absence of direct contact seal to balance the valve trim facilitates the use of a variety of seal materials in constructing the control valve trim 14.

In the embodiments discussed above, the plug 16 includes a series of sections 154, 160, 176, and 196 that increase in diameter from the first (upstream) end 150 to the second (downstream) end 152 of the plug 16. The sections 160, 176, and 196 of the plug 16 include multiple pairs of slots 164, 174, 186, 194, 206, and 214 that are offset around the diameter of the plug 16. The slots 164, 174, 186, 194, 206, and 214 are configured to align with the annular recesses 62, 64, 66, 68, 70, and 71 and protrusions 104, 106, 108, 110, 112, 114, and 116 of the liner 18 to direct flow in fluid path that includes a series of gentle turns.

Figure 5A:
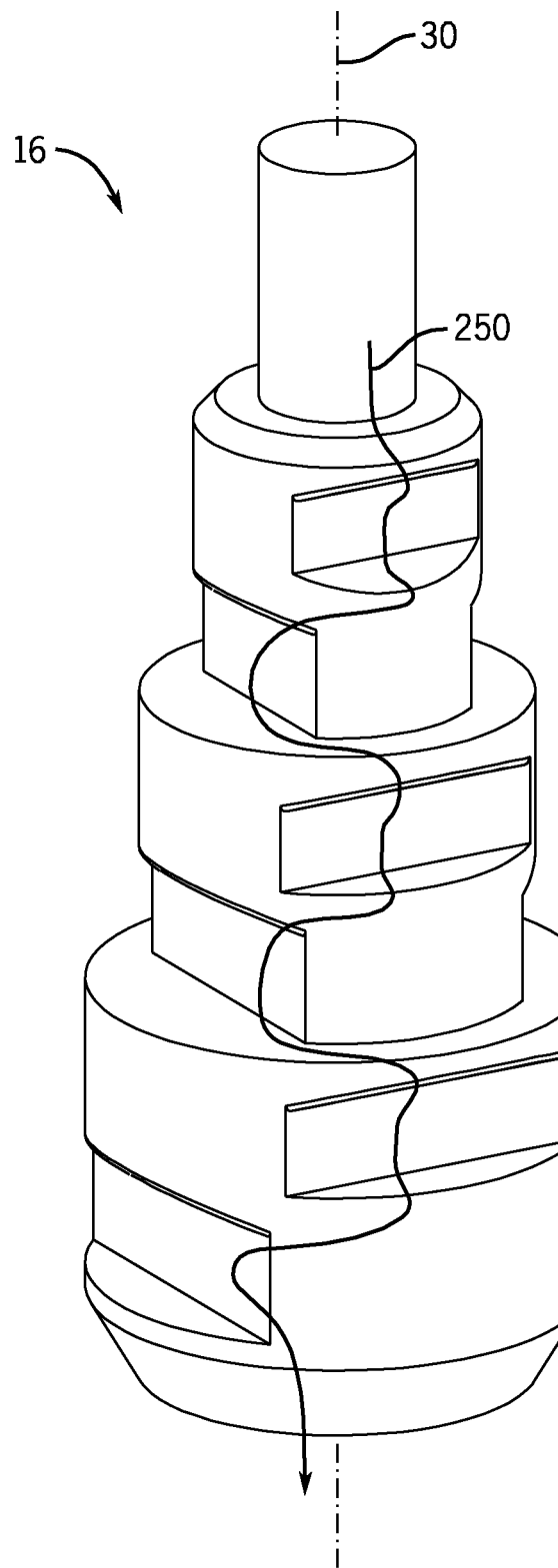
FIG. 5A is a perspective view that illustrates an exemplary fluid flow path in accordance with embodiments of the present technique.
Figure 5B:
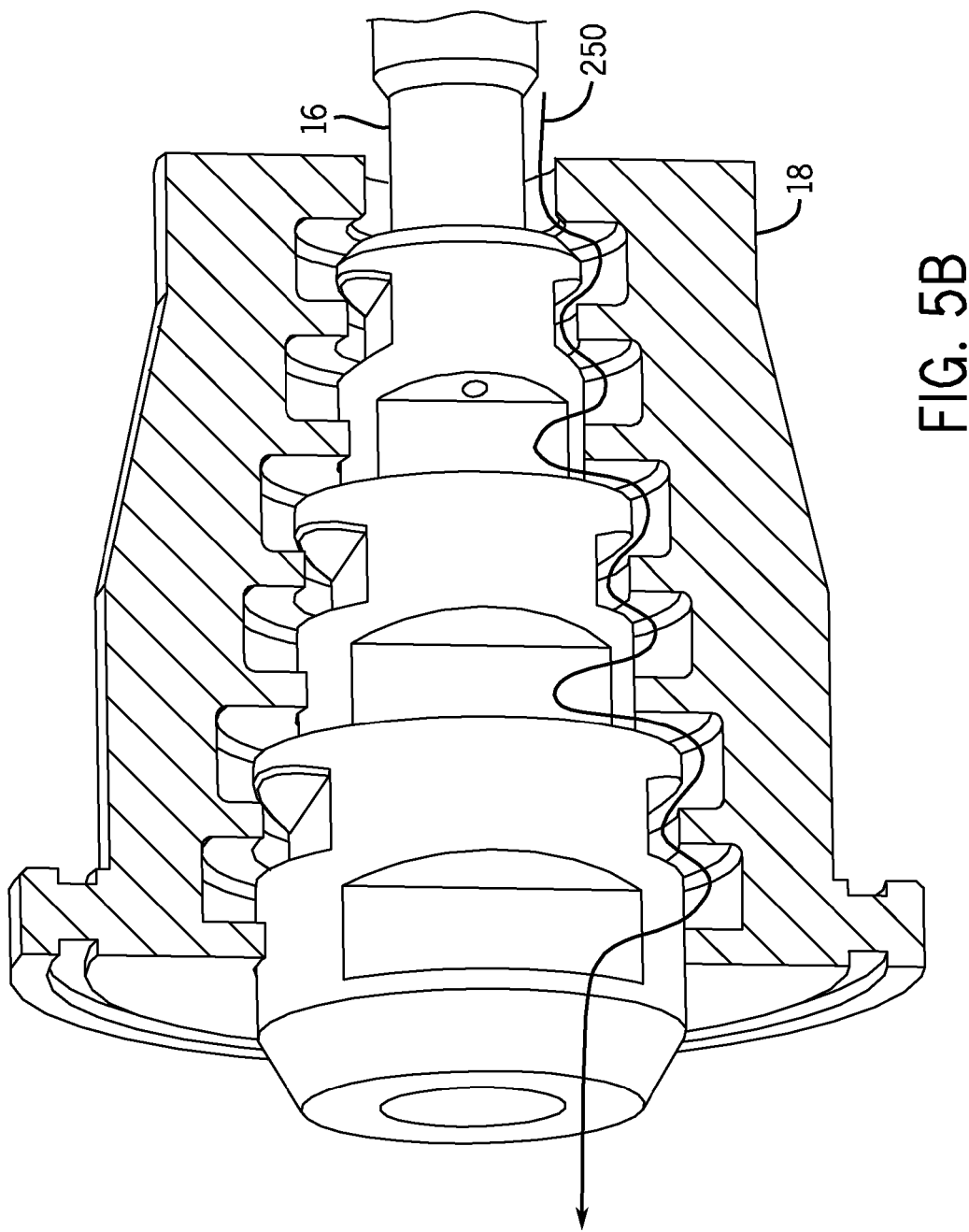
FIG. 5B is a cross-sectioned view of the plug, the liner, and a flow path, in accordance with embodiments of the present technique.
Figure 5C:
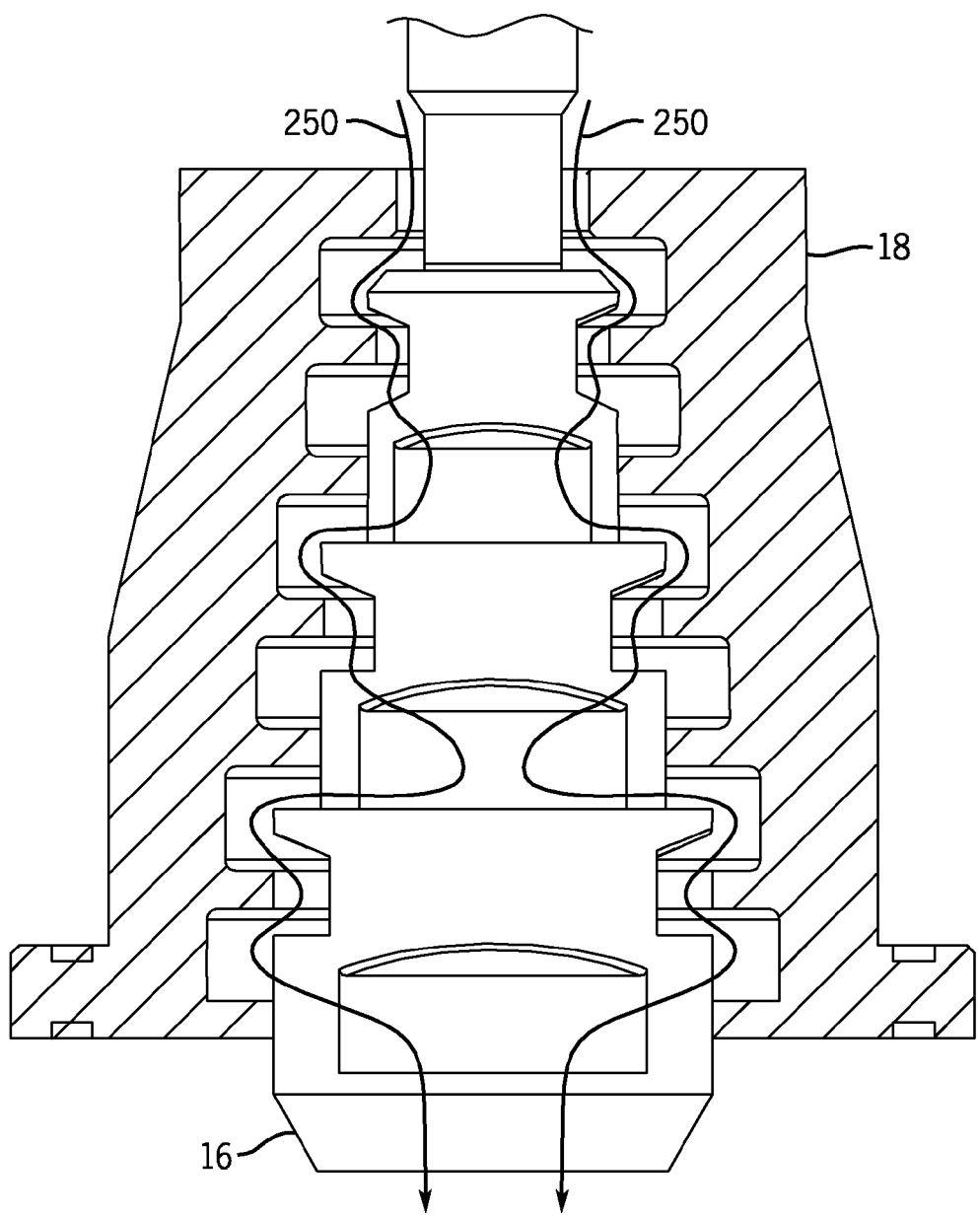
FIG. 5C is a cross-sectioned view of the plug and the liner that illustrates two flow paths in accordance with embodiments of the present technique.

FIGS. 5A-5C depict the fluid flow around the plug 16 and through the control valve trim 14 in accordance with embodiments of the present technique. Specifically, FIG. 5A illustrates an exemplary fluid flow path 250 proximate the plug 16 if the plug 16 were disposed internal to the liner 18. As illustrated, the fluid flow path 250 includes a series of gentle turns (e.g., turns having a bend angle of less than 90 degrees and/or less than approximately 45 degrees) as the fluid flows through each of the six stages. The gentle turns may be attributed to a combination of the fluid being directed in varying directions along the longitudinal axis 30 (e.g., an axial direction), flow that is normal to the longitudinal axis (e.g., in a radial direction), and flow that is circumferential (e.g., in a circular path along the circumference of the annular recesses 62, 64, 66, 68, 70, and 71, and the protrusions 104, 106, 108, 110, 112, 114, and 116). The expanding area for the fluid to flow in each stage also contributes to reducing the bend angle or each turn. In other words, fluid that is moving in an outward radial direction may continue at least partially in the outward radial direction as the fluid flow from a first stage (or chamber) having a first diameter to a second stage (or chamber) having a diameter that is greater than the first diameter.

FIG. 5B depicts the flow path 250 in a cross-sectioned view of the plug 16 and the liner 18. FIG. 5C depicts two flow paths 250 in a cross-sectioned view of the plug 16 and the liner 18. Although in each of the illustrations it may appear that the fluid flow path 250 includes turns that are greater than 45 degrees, the angle of the fluid flow path may not simultaneously reflect all three dimensions of the flow path 250. For example, in FIG. 5C where the fluid path 250 includes bends from each stage, there may also be an additional component of velocity acting transverse to the plane of the two dimensional figure. Accordingly, the control valve trim 14 may provide increased fluid capacity, pressure throttling, and trash tolerance, with a reduced reliance on the temperature limitations that may be characteristic of other balanced valves 12.

The specific embodiments of the control valve trim 14, including the plug 16 and the liner 18, depicted in FIGS. 2 through 5 are merely exemplary and not intended to be limiting. For example, FIGS. 6 through 9 present other exemplary embodiments of the plug 16 and liner 18, which may be used in the control valve trim 14. In particular, FIGS. 6A and 6B illustrate perspective views of another exemplary embodiment of the plug 16 of the control valve trim 14. As illustrated, the plug 16 again includes a series of generally cylindrical sections increasing in diameter from the first (upstream) end 150 to the second (downstream) end 152 of the plug 16. In particular, the embodiment illustrated in FIGS. 6A and 6B includes a first section 252 and a second section 254. However, in other embodiments, more than two sections may be used. A collar section 256 may connect the first section 252 and the second section 254. As illustrated, the collar section 256 may generally increase in diameter along the longitudinal axis 30 from the first section 252 to the second section 254.

As opposed to the plug 16 described above with reference to FIGS. 1, 2, 4, and 5, the exemplary embodiment of the plug 16 illustrated in FIGS. 6A and 6B may not include a stem extending from the first end 150 of the plug 16. Rather, the present embodiment may include a stem 258 as a cylindrical protrusion from the second end 152 of the plug 16. As such, the first end 150 of the plug 16 illustrated in FIGS. 6A and 6B may include a generally conical surface from a cap end 260 of the plug 16 to the first section 252, over which fluid may flow through the control valve trim 14. The stem 258 extending from the second end 152 of the plug 16 may be coupled to the actuator mechanism 28, as discussed above with respect to FIG. 1.

In addition to the second section 254 having a generally larger diameter than the first section 252, each individual section may also generally increase slightly in diameter along the longitudinal axis 30 from an upstream portion to a downstream portion. For example, the first section 252 may increase slightly (e.g., 10%) in diameter from the first end 150 of the plug 16 to the collar section 256. However, just upstream of the collar section 256, a small tail portion 260 of the first section 252 may decrease in diameter. This decrease in diameter may, for instance, enable smoother transition of the fluid flow from the first section 252 to the collar section 256. In addition, the second section 254 may increase slightly (e.g., 10%) in diameter from the collar section 256 of the plug 16 to the second end 152 of the plug 16. However, just upstream of the second end 152, a small tail portion 262 of the second section 254 may decrease in diameter. Again, this decrease in diameter may, for instance, allow for smoother transition of the fluid flow from the second section 254.

The embodiments described above with respect to FIGS. 2 through 5 depicted plugs 16 which include multiple slots on opposite sides of sections of the plug 16. In contrast, the first section 252 of the plug 16 illustrated in FIGS. 6A and 6B may, for instance, include three scoop-like depressions 264 (e.g., curved or concave depressions) within the generally cylindrical surface of the first section 252 of the plug 16. As illustrated, the depressions 264 may be spaced equally around the circumference of the first section 252 such that all three depressions 264 are similarly shaped and the resulting three ridges 266 adjacent to the depressions 264 are also similarly shaped. More specifically, each of the three depressions 264 may be spaced 120 degrees from each other about the longitudinal axis 30. Although illustrated as three depressions 264, the number of depressions 264 used in the first section 252 of the plug 16 may vary.

Similarly, the second section 254 of the plug 16 illustrated in FIGS. 6A and 6B may also include three scoop-like depressions 268 (e.g., curved or concave depressions) within the generally cylindrical surface of the second section 254 of the plug 16. Again, as illustrated, the depressions 268 may be spaced equally around the circumference of the second section 254 such that all three depressions 268 are similarly shaped and the resulting three ridges 270 adjacent to the depressions 268 are also similarly shaped. More specifically, each of the three depressions 268 may be spaced 120 degrees from each other about the longitudinal axis 30. Also, although illustrated as three depressions 268, the number of depressions 268 used in the second section 254 of the plug 16 may vary.

The depressions 264 of the first section 252 and the depressions 268 of the second section 254 may be spaced in such a way that the depressions 264 of the first section 252 generally line up with ridges 270 of the second section 254. In addition, the depressions 268 of the second section 254 may generally line up with ridges 266 of the first section 252. For instance, as illustrated, the depressions 268 of the second section 254 may be rotated 60 degrees about the longitudinal axis 30 from the depressions 264 of the first section 252. This alternating arrangement of depressions and ridges between interconnected stages of the plug 16 may enable a tortuous fluid path between the stages.

Figure 7A:
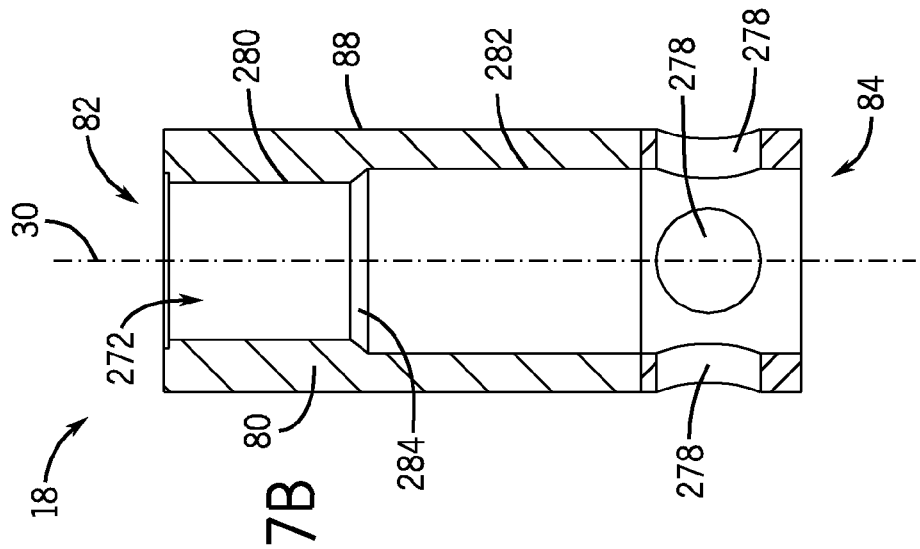
FIG. 7A is a perspective view of another exemplary embodiment of a liner of the control valve trim, for use with the plug of FIGS. 6A and 6B.
Figure 7B:
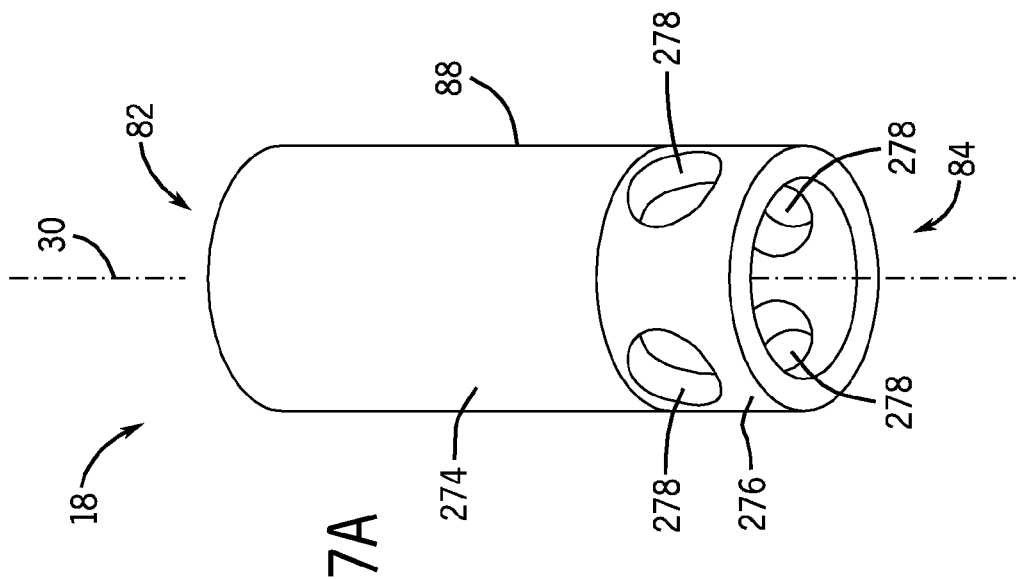
FIG. 7B is a cross-sectioned view of the exemplary liner embodiment of FIG. 7A.

FIGS. 7A and 7B illustrate a perspective view and a cross-sectioned view of another exemplary embodiment of the liner 18, for use with the plug 16 illustrated in FIGS. 6A and 6B. Again, the liner 18 includes a liner body 80 having a first (upstream) end 82 and a second (downstream) end 84. The first end 82 is configured to direct fluid into an interior cavity 272 of the liner 18. The liner 18 again includes an external surface 88 that facilitates disposing the liner 18 into the fluid bore 20 of the valve 12. In other words, as described above, the profile of the external surface 88 is similar to and/or conforms to the profile of an internal surface of the fluid bore 20. When the liner 18 is disposed in the fluid bore 20, the interface between the liner 18 and the fluid bore 20 may effectively create a seal, thereby forcing fluid from the bore 20 into the channel 32 of the control valve trim 14, as illustrated in FIG. 1.

The liner 18 also includes a first section 274 and a second section 276. As described below with respect to FIG. 8, the plug 16 illustrated in FIGS. 6A and 6B and the liner 18 generally interact within the first section 274 of the liner 18. The second section 276 of the liner 18 is generally the section of the liner 18 through which the fluid may exit the interior cavity 272 of the liner 18. Specifically, the second section 276 of the liner 18 may include multiple openings 278 through which the fluid may exit the interior cavity 272 of the liner 18. Although depicted as including four openings 278, the second section 276 of the liner 18 may include any suitable number of openings 278.

The first section 274 of the liner 18 may include multiple internal bored sections which may facilitate interaction with the plug 16 illustrated in FIGS. 6A and 6B. As illustrated in FIG. 7B, the liner 18 may include a first bore 280 and a second bore 282. In general, the diameter of the second bore 282 is greater than the diameter of the first bore 280. In addition, a smooth transition from the smaller diameter of the first bore 280 to the larger diameter of the second bore 282 may be accomplished using a transition bore 284. The transition bore 284 may gradually increase in diameter from the smaller diameter of the first bore 280 to the larger diameter of the second bore 282.

Figure 8:
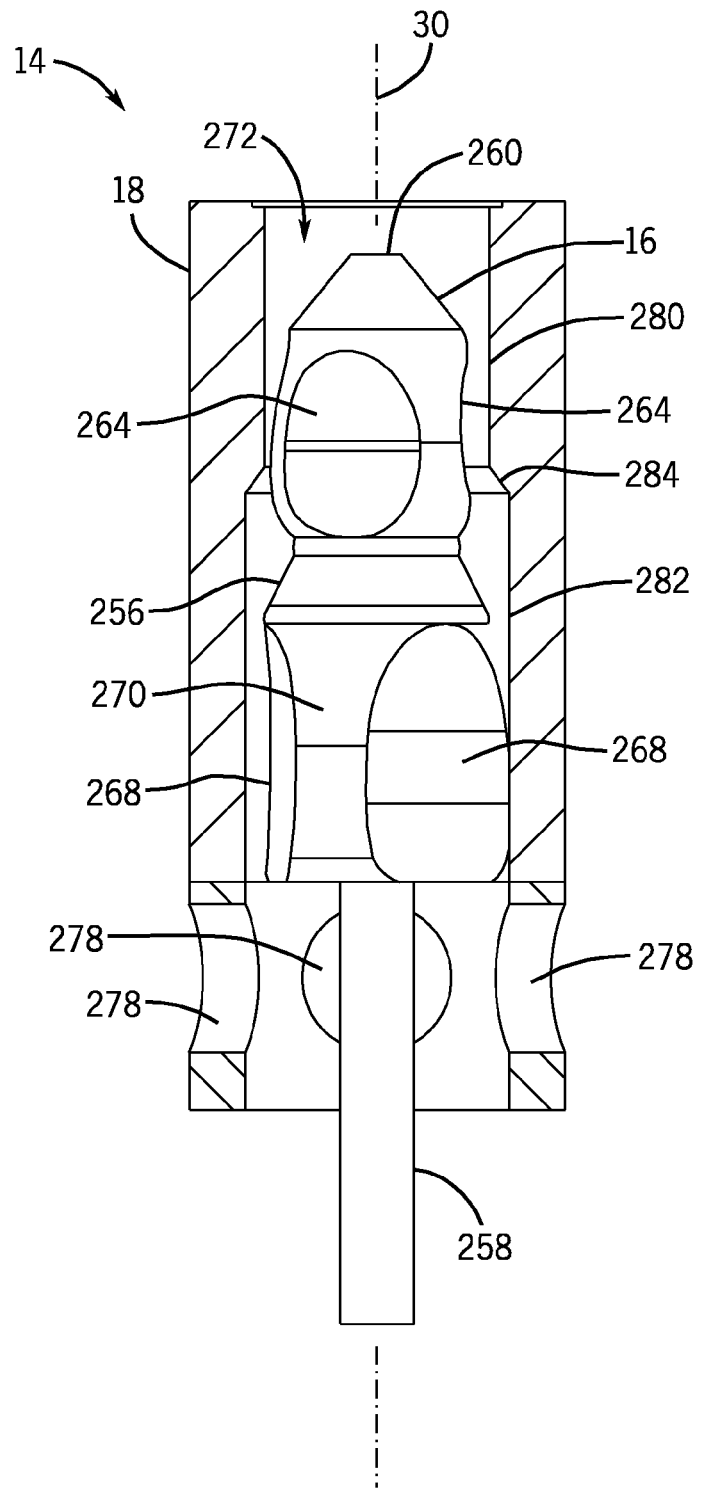
FIG. 8 is a cross-sectioned view of the control valve trim, incorporating the exemplary plug and liner embodiments of FIGS. 6 and 7.

The depressions 264 on the first section 252 of the plug 16 illustrated in FIGS. 6A and 6B may generally interact with the interior surface of the first bore 280. In addition, the depressions 268 on the second section 254 of the plug 16 illustrated in FIGS. 6A and 6B may generally interact with the interior surface of the second bore 282. In particular, FIG. 8 illustrates a cross-sectioned view of the control valve trim 14, incorporating the exemplary embodiments of the plug 16 and liner 18 described in FIGS. 6 and 7. As illustrated, as fluid flows through the interior cavity 272 of the liner 18, the fluid may first flow through the first bore 280 section, across the first section 252 of the plug 16. In the particular alignment illustrated in FIG. 8, the fluid may, for instance, flow along the right side of the first bore 280, through the space created by the depression 264 on the right side of the first section 252 of the plug 16. Similarly, as fluid continues to flow through the interior cavity 272 of the liner 18, the fluid may next flow through the second bore 282 section, across the second section 254 of the plug 16. In the particular alignment illustrated in FIG. 8, the fluid may, for instance, flow along the left side of the second bore 282, through the space created by the depression 268 on the left side of the second section 254 of the plug 16.

Figure 9B:
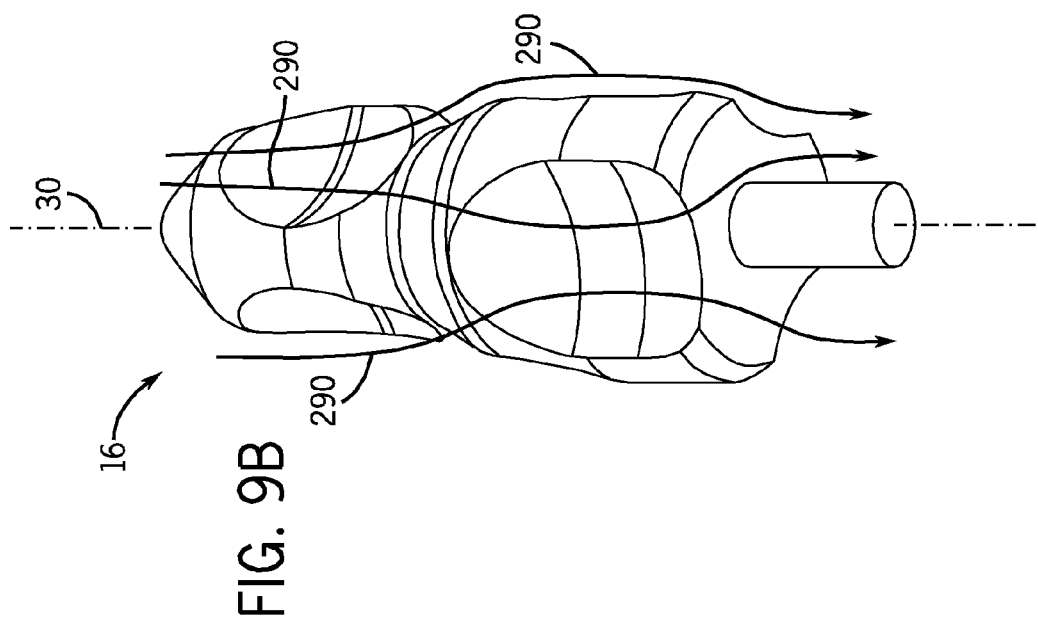
FIGS. 9A and 9B are perspective views that illustrate exemplary fluid flow paths in accordance with embodiments of the present technique.
Figure 9A:
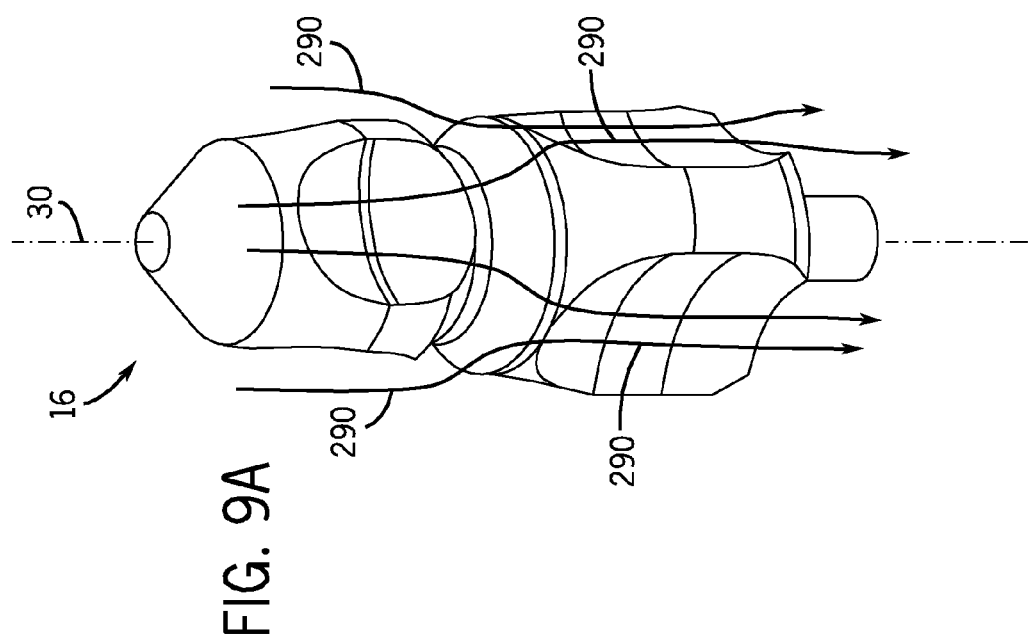

Similar to the embodiments described above with respect to FIGS. 2 through 5, the alternating arrangement of the depressions 264 of the first section 252 of the plug 16 and the depressions 268 of the second section 254 of the plug 16 may enable the control valve trim 14 to direct the flow of fluid through a series of gentle turns. For example, FIGS. 9A and 9B depict fluid flows around the plug 16 illustrated in FIGS. 6 and 8. Specifically, FIGS. 9A and 9B illustrate exemplary flow paths 290 proximate the plug 16 if the plug 16 were disposed internal to the liner 18 illustrated in FIGS. 7 and 8. As illustrated, the fluid flow paths 290 include a series of gentle turns (e.g., turns having a bend angle of less than 90 degrees and/or less than approximately 45 degrees) as the fluid flows through the two stages.

As described above, the gentle turns may be attributed to a combination of the fluid being directed in varying directions along the longitudinal axis 30, flow that is normal to the longitudinal axis 30, and flow that is circumferential. The expanding area for the fluid to flow in each stage also contributes to reducing the bend angle or each turn. In other words, fluid that is moving in an outward radial direction may continue at least partially in the outward radial direction as the fluid flow from a first stage having a first diameter to a second stage having a diameter that is greater than the first diameter.

Figure 10:
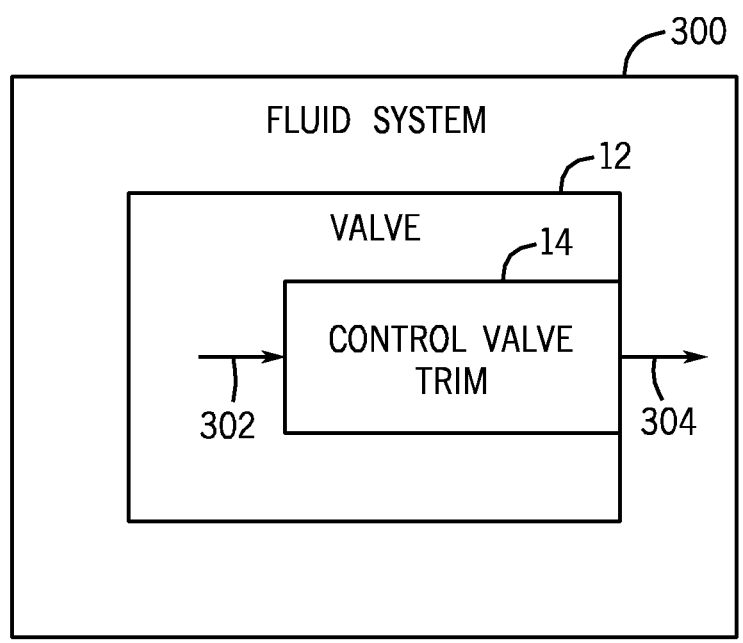
FIG. 10 is a block diagram of a fluid system in accordance with embodiments of the present technique.

FIG. 10 is a block diagram that depicts a fluid system 300 employing the control valve trim 14 in accordance with embodiments of the present technique. As discussed previously with regard to FIG. 1, the control valve trim 14 may be disposed in the flow bore 20 of the valve 12, and the valve 12 may be disposed in a fluid stream of the fluid system 300. In the fluid system 300, the fluid may pass through the valve 12, enter the control valve trim 14 via an inlet, as indicated by arrow 302, and exit the control valve trim 14 as indicated by arrow 304. After exiting the control valve trim 14, the fluid may be directed to other flow paths, valves 12, and or control valve trims 14 located integral to or external to the fluid system 300.

The fluid system 300 may include any variety of systems that employ valves and/or throttling devices to regulate the flow of fluids (e.g., a liquid and/or gaseous state, which may or may not include suspended solids). For example, the fluid system 300 may include a system employed in the oil and gas industry, the power production industry, chemical plants, or other such applications. In oil and gas applications, the valve 12 and control valve trim 14 may be employed in a mineral extraction system (such as an oil and gas wellhead or christmas tree), in piping applications (such as a subsea or surface oil and gas manifold), a processing system (such as an oil and gas refinery), and so forth. In the power production industry, the control valve trim 14 may be employed in power plants to route and regulate the fluid flow of steam as it passes to and from power turbines. In chemical plants, the control valve trim 14 may be employed integral with certain processes or in line with various pipes to regulate the flow of liquids and gases between production facilities and processes. These systems may include fluid flow capacity (Cv—the volume of water in US gallons per minute that will flow through the coupling with a pressure drop of 1 psi) in excess of 1000 Cv.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A control valve trim, comprising:
 a plug and a liner, each having a plurality of stages along a longitudinal axis of the control valve trim, wherein the plug and the liner comprise an expanding area between each of the plurality of stages, the expanding area is configured to provide an increased flow path area, wherein each of the plurality of stages of the plug comprises a first set of slots spaced apart from one another circumferentially around the longitudinal axis and a second set of slots spaced apart from another circumferentially around the longitudinal axis, wherein the first and second sets of slots are axially spaced apart along the longitudinal axis, each of the first set of slots are generally parallel with one another, and each of the second set of slots are generally parallel with one another.

2. The control valve trim of claim 1, comprising a three dimensional fluid flow path including axial, radial, and circumferential turns along the longitudinal axis.

3. The control valve trim of claim 2, wherein the three dimensional fluid flow path includes a plurality of turns and an increasing cross-sectional area along the longitudinal axis from an inlet to an outlet of the three dimensional fluid flow path.

4. The control valve trim of claim 1, comprising a pressure balancing chamber within the plug, wherein the pressure balancing chamber is configured to balance axial forces acting on the plug.

5. A control valve trim, comprising:
a plug, comprising:
a plurality of sections arranged in series along a longitudinal axis of the plug, wherein each of the plurality of sections comprises a diameter that is greater than the diameter of the preceding section, and wherein
each of the plurality of sections comprises a first set of slots spaced apart from one another circumferentially around the longitudinal axis and a second set of slots spaced apart from another circumferentially around the longitudinal axis, wherein the first and second sets of slots are axially spaced apart along the longitudinal axis, and wherein the first set of slots is offset from the second set of slots by approximately 90 degrees circumferentially around the longitudinal axis; and
a liner, wherein the plug is disposed internal to the liner.

6. The control valve trim of claim 5, wherein the liner comprises a plurality of annular recesses arranged in series along the longitudinal axis about an interior of the liner, and wherein each of the plurality of annular recesses comprises a diameter that is greater than the diameter of the preceding annular recess.

7. The control valve trim of claim 6, wherein each of the plurality of annular recesses corresponds to one of the first or second set of slots of one of the plurality of stages.

8. The control valve trim of claim 7, wherein each annular recess is slightly offset along the longitudinal axis from the corresponding set of slots.

9. The control valve trim of claim 5, wherein the first set of slots is rotated from the second set of slots about the longitudinal axis.

10. The control valve trim of claim 5, wherein the liner comprises a plurality of annular recesses arranged in series along the longitudinal axis about an interior of the liner, and wherein each of the plurality of annular recesses comprises a diameter that is greater than the diameter of the preceding annular recess.

11. The control valve trim of claim 5, comprising a pressure balancing chamber within the plug, wherein the pressure balancing chamber is configured to balance axial forces acting on the plug.

12. The control valve trim of claim 5, wherein the liner comprises a plurality of internal bored sections arranged in series along the longitudinal axis about an interior of the liner, wherein each of the plurality of internal bored sections comprises a diameter that is greater than the diameter of the preceding internal bored section, and wherein each of the plurality of sections of the plug correspond to a respective internal bored section of the liner.

13. The control valve trim of claim 12, wherein each section of the plug is offset along a longitudinal axis from the corresponding internal bored section of the liner.

14. A control valve system, comprising:
a plug having a series of sections increasing in diameter along a longitudinal axis of the plug, wherein each of the sections of the plug includes a first pair of slots and a second pair of slots, wherein the first and second pairs of slots are spaced apart from one another by approximately 90 degrees circumferentially around the longitudinal axis, the first pair of slots is located at a different axial position from the second pair of slots along the longitudinal axis, each slot of the first and second pairs of slots is formed in a radially most distal surface of the respective section of the plug, the first pair of slots are generally parallel to one another, and the second pair of slots are generally parallel to one another.

15. The control valve system of claim 14, comprising:
a liner having a series of annular recesses along the longitudinal axis, wherein the series of annular recesses increase in diameter from an inlet of the liner to an exit of the liner.

16. The control valve system of claim 15, wherein the liner comprises internal protrusions that increase in diameter from the inlet of the liner to the exit of the liner.

* * * * *